Patented Apr. 27, 1954

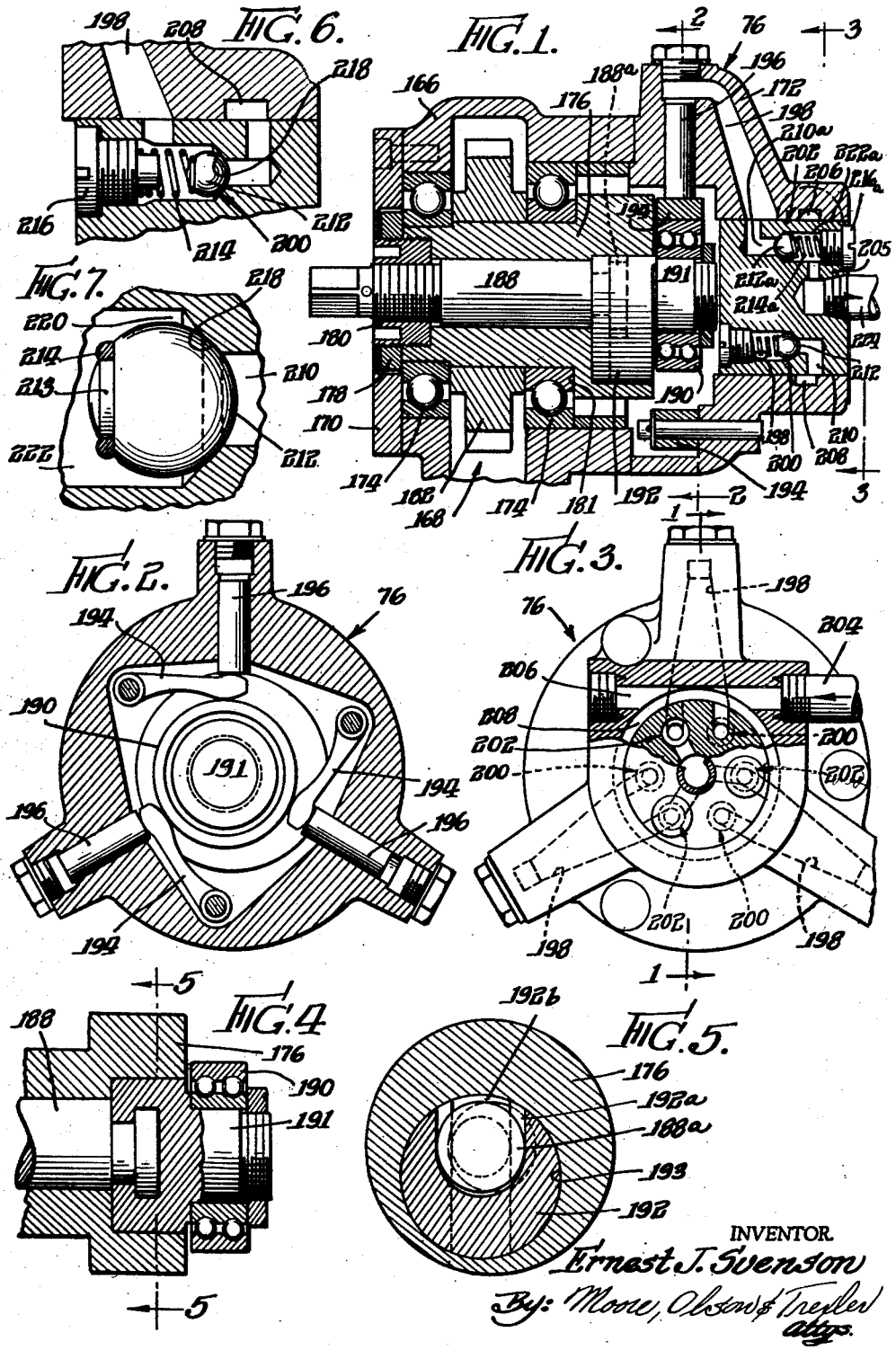

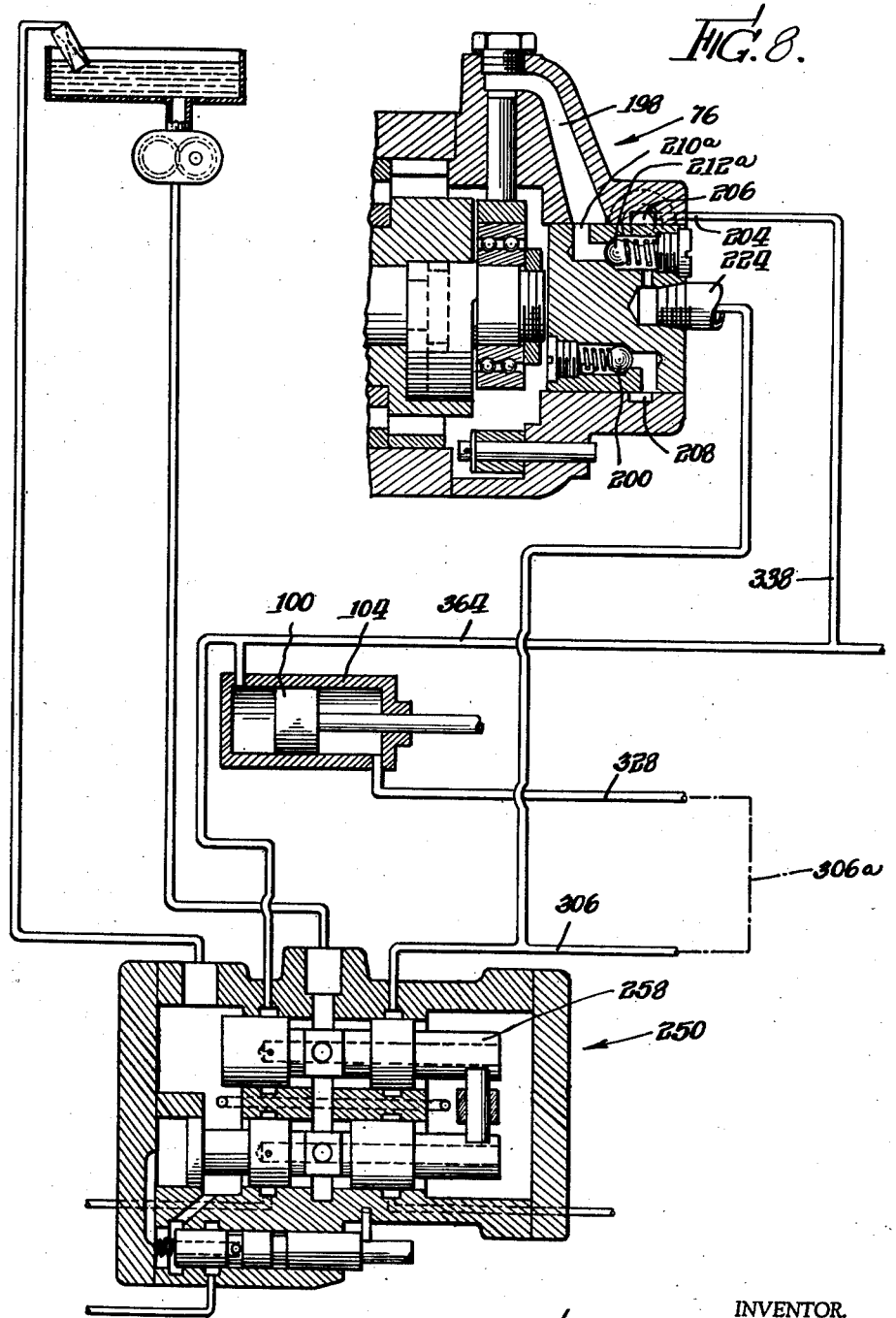

2,676,608

UNITED STATES PATENT OFFICE 2,676,608

VALVE STRUCTURE

Ernest J. Svenson, Rockford, Ill., assignor, by mesne assignments, to Odin Corporation, Chicago, Ill., a corporation of Illinois Application September 16, 1940, Serial No. 356,896, which is a division of application Serial No. 684,677, August 11, 1933. Divided and this application July 16, 1945, Serial No. 605,214

13 Claims. (Cl. 137—343)

This invention relates to valve structures in mechanisms for fluid handling, and concerns particularly valves for use in pump structures for delivering fluid at relatively high pressure with volumetric accuracy.

The present invention is a division of my copending application, Serial No. 356,896, filed September 16, 1940, now Patent No. 2,382,452, and entitled "Fluid Pumping Mechanism"; said application, and the present application, also being divisions of my parent application, Serial No. 684,677, filed August 11, 1933, and now issued as Patent No. 2,215,257.

In fluid handling mechanisms and apparatus, the provision of satisfactorily operable and leakproof control valves, for effecting the liquid or other fluid control, is a matter of major importance. For example, in pump structures, and particularly in pumps adapted for the delivery of fluid at high pressure, even a relatively small fluid slippage or leakage within the pump will result in greatly reduced efficiency of operation. One portion of the pump structure, wherein such fluid slippage or leakage may occur, concerns the control valves for controlling the fluid flow to and from the pumping cylinders.

It is an object of the present invention to provide a valve structure or mechanism, of improved construction and improved operating characteristics.

More specifically stated, it is an object of the present invention to provide an improved control valve structure, for use in fluid handling and control apparatus, wherein the valve structure is more leakproof in operation and when in seated or closed position; wherein the valve structure may be rapidly and automatically shifted between open and accurately seated closed positions; and wherein the valve structure will be more durable and reliable in service, and will not leak in operation even when subjected to extended periods of use under extreme service conditions.

A further object of the invention is to provide an improved valve structure, particularly adapted for use with pump mechanisms for delivering liquid or other fluid at relatively high pressure and with a high degree of volumetric efficiency.

A still further object of the invention is to provide, particularly for use in a pump structure or the like, improved automatically operable ball check valves, for cooperation with the fluid pressure generating elements, such as pump plungers or the like; said valves also being mounted in a unit frame structure to facilitate assembly.

Various other objects, advantages and features of the present invention will be apparent from a consideration of the following specification, when taken in connection with the accompanying drawings, wherein a preferred embodiment is set forth for purposes of illustration.

In the drawings, wherein like reference numerals refer to like parts throughout:

Figure 1 is a transverse sectional view of a variable delivery and relatively high pressure pumping mechanism, incorporating a valve structure constructed in accordance with and embodying the principles of the invention, said view being taken substatinally along the line 1—1 of Figure 3;

Figure 2 is a transverse sectional view of said pump taken substantially along the line 2—2 of Figure 1;

Figure 3 is an end elevational view of the pump, shown partly in section, said view being taken substantially along the line 3—3 of Figure 1;

Figure 4 is a fragmentary detail view of the eccentric driving mechanism for the pump structure shown in Figures 1 to 3 inclusive;

Figure 5 is a fragmentary, transverse, sectional view of the eccentric driving mechanism taken substantially along the line 5—5 of Figure 4;

Figure 6 is a detail sectional view of one of the valve structures disclosing the manner in which said valve serves to control communication between the inlet side of the pump and the pump passageways communicating with the plungers or pistons;

Figure 7 is an enlarged detail view of the ball valve of Figure 6 to more clearly illustrate the structural features thereof which render it particularly adaptable for use in closed circuits and the like as illustrated more particularly in Figure 8; and Figure 8 is a circuit diagram illustrating the manner in which the pumping mechanism may be employed in a closed circuit for operating a fluid actuator structure.

The present invention, and the claims herein presented, are directed to the valve structures, and their characteristics and modes of operation. Claims to the pumping elements, and to the circuit and other features of the structure illustrated, are presented in said aforementioned companion cases. The valve structures of the present invention are herein illustrated as embodied in a high pressure plunger pump, and associated fluid actuator circuit, with which they are well adapted for use, and by which their characteristics and modes of operation are shown. It is to be understood, however, that the valve structures of the present invention may be used with various types of liquid or other fluid handling or operating apparatus; including, for example, specifically different pump structures and other mechanisms for operation with or for the handling of fluid at relatively high pressures and with required volumetric accuracy.

Referring more specifically to the drawings, the pump structure shown is designated generally by the numeral 76. This pumping mechanism, in the particular structural embodiment shown, includes a central housing 166, which carries a pump driving mechanism designated generally by the numeral 168, an end plate 170, and an oppositely disposed pump housing 172 serving as an enclosure and support for the plunger and valve elements of the pump. Preloaded anti-friction bearings 174 provided within the housing 166 serve as the support for a rotary driving member or sleeve 176. Longitudinal displacement of the sleeve 176 to the right, Figure 1, is prevented by a clamping ring 178 and an adjusting nut or screw 180, while longitudinal displacement of the sleeve 176 to the left is prevented by a flange 181 which engages the right preloaded anti-friction bearing 174.

The sleeve 176 carries a driving gear 182 which is adapted to mesh with another gear (not shown) forming a part of a transmission from a suitable driving means (not shown). A driving member 188 mounted within and rotatably adjustable with respect to the driving sleeve 176 serves as the means for adjusting the eccentricity of a driving ring 190. This ring 190 forms the outer race of a radial ball bearing mounted upon an extended stub shaft portion 191 of a cylindrical adjustment member 192. As best seen in Figure 1, the stub shaft portion 191 is eccentric to the cylindrical adjusting member 192. The member 192 is supported within a cylindrical recess 193 of the member 176 and is eccentric with respect to said member 176. It will, therefore, be clear that the adjustment mechanism is such that rotation of the member 192 within the recess 193 will vary the eccentricity of the stub shaft portion 191 with respect to the axis of the sleeve 176. In other words, rotatable adjustment of the cylindrical member 192 causes the stub shaft portion 191 to experience eccentric adjustment with respect to the axis of the sleeve 176 which thereby affects the degree of eccentricity of the driving ring 190.

The member 188 has a head portion 188a which is eccentric to the axis of the member 188 and registers within a recess 192a in the member 192. A reduced portion which connects the member 188 with the head 188a passes through a transverse recess or slot 192b. Thus when it is desired to vary the eccentricity of the driving ring 190, the nut 180 is first loosened and then rotation is imparted to the member 188 by gripping the outer squared end thereof. Rotation of the member 188 causes rotation of the cylindrical member 192 and this results in varying the eccentricity of the stub shaft portion 191 with respect to the axis of rotation of the sleeve 176 and the member 188. After the required degree of eccentric adjustment has been made, the nut 180 is again tightened. Rotation is imparted to the sleeve 176 and the member 188 by the driving gear 182, and the ring 190 will execute an eccentric motion to a degree which is dependent upon the amount of eccentric adjustment of the stub portion 191 as previously described.

A plurality of fingers 194 are uniformly spaced about the axis of the sleeve 176, and are pivotally supported within the end frame or casing 172 as clearly shown in Figure 2. The free extremities of these fingers are interposed between the driving ring 190 and companion pump pistons or plungers 196. The curvature of the fingers is such as to impart symmetrical acceleration and deceleration of the pistons 196. Fluid is directed toward and away from the outer ends of the pistons 196 in companion passageways 198, Figures 1 and 3. Each of these passageways 198 communicates with a pair of valves constructed in accordance with the present invention, namely an intake control valve designated generally by the numeral 200 and an outlet control valve 202.

Fluid is directed to the valves 200 from an intake conduit 204, Figure 3, which constantly communicates through a transverse passage 206 with an annular passage or port 208. This annular passage 208 directs fluid to the intake valves 200 through a passage 210 which is companioned to each valve.

Each of the aforesaid valves 200 includes a ball valve member 212. I prefer to employ valve balls comprised of Swedish steel, which has been especially treated to obtain an unusually hard and tough structure. I have found what are well known in the trade as Hultgren Process Brinell balls, to perform very satisfactorily. Each of the balls 212 is normally urged by means of a coiled spring 214, preferably tapered as illustrated in Figure 6, interposed between said ball and a threaded plug 216 into engagement with a valve seat 218. Referring to Figure 7, wherein I have disclosed an enlarged view of a ball and seat therefor, it will be seen that the seat 218 is shaped to conform accurately with a portion of the spherical surface of the valve ball. By having the spring 214 tapered or converging toward the valve ball, as illustrated in Figure 6, the centering of the ball within its seat is materially enhanced.

Each ball valve 212 is provided with an annular recess 213 designed to receive the adjacent portion of the coiled spring 214, Figure 7. The portion of the coiled spring 214 which is received by the annular recess 213, is formed with converging walls which are adapted to abut the companion walls or surfaces of the recess. This arrangement positively prevents the ball from being dislodged and insures that when the valve is closed each portion of the ball always engages the same corresponding portion of the valve seat 218.

Attention is also directed to the fact that the cross-sectional area of the annular space 220 presented between the outer periphery of the ball 212 and the inner periphery of the valve chamber 222 is less than the cross-sectional area presented by the intake passageway 210. The significance of this construction will be more apparent when a hydraulic circuit for which the pump mechanism 76 is particularly adapted, is described.

From the foregoing, it will be apparent that fluid from the conduit or pipe line 204 may pass through each valve 200 and into the passageway 198 companion thereto. The intake of the fluid occurs during the inward stroke of the associated piston or plunger 196. During the compression stroke of the plunger 196, fluid passes from each passageway 198 into a passageway 210a which communicates with a discharge valve 202. Each valve 202 is similar in structural characteristics to the valves 200 previously described. Each valve 202 includes a ball valve 212a, a chamber 222a, and a threaded plug 216a. Fluid passing through the valves 202 enters a discharge conduit or pipe line 224.

It will be noted that each spring 214a for the discharge valve balls 212a is more powerful than the spring 214 for the intake valve balls 212, whereby to preclude the opening of the balls 212a when the pistons are being charged. In other words, each valve ball 212a will only open when the piston companion thereto is experiencing its compression stroke, and said valve will not open during any other portion of the cycle under normal pressure conditions in the propelling side of the circuit connected therewith.

The pump mechanism just described is designed to deliver fluid to any desired mechanism such as a hydraulic actuator at a predetermined rate. The rate of displacement of the pump can be varied, as previously explained, by merely adjusting the eccentricity of the driving ring 190, which adjustment affects the stroke of the pistons or plungers 196.

For the purpose of explaining one practical application of the feed pump just described, I have illustrated a circuit diagram in Figure 8. This circuit is a portion of the circuit diagram disclosed in my aforesaid parent application with all parts omitted except those necessary to a clear understanding of the operation of the pump and its valve structures forming the subject matter of the present invention. Assume that one of the pistons 196 is experiencing its outward or compression stroke. Fluid under pressure is thereby forced from the space above the piston 196 through the associated passages 198 and 210a and past the discharge valve ball 212a into the outlet conduit 224. From the conduit 224, the fluid is conducted into the conduit 306 which is blocked at one end by a control valve designated generally by the numeral 250. The details of the control valve 250 form no part of the present invention. Reference may be made, if desired, to my aforesaid parent application for a more complete description thereof.

A valve member 258 of the control valve mechanism 250 is so positioned as to block one extremity of the conduit 306. The other end of the conduit 306 may be connected through any suitable mechanism designated diagrammatically by a dot and dash line 306a with a conduit 328 which conducts fluid to the right chamber of a hydraulic cylinder 104. This entrance of the fluid into the cylinder 104 causes a piston 100 to move to the left and displace fluid from the left-hand chamber of the cylinder 104 into a conduit 364 and thence through a conduit 338 which communicates with conduit 204. From conduit 204 fluid passes into the inlet passage 206 of the pump and thence into the annular distributing passage 208 as previously described. The passage 208 communicates with all of the inlet ball valves 200. Fluid will not flow through any valve 200 with the associated piston moving outwardly because the fluid pressure in the associated passage 198 is greater than the pressure of the fluid which is being returned to the intake side of the pump. However, as the driving ring 190 moves so as to permit the inward movement of one or more of the plungers 196, the pressure in the passages 198 associated with such plungers will decrease, thereby permitting fluid to flow from the passage 208 through the companion valves 200 of the receding or inwardly moving plungers and will exert a driving force tending to move the plungers inwardly.

From the foregoing description it will be understood that when the pump 76 is connected in the above described closed circuit, fluid within the various conduits moves as a unit, one part being forced under pressure outwardly through the pump passages 198 and the ball valves 202 and thence to the actuator cylinder 104, and the other part moving from the discharge side of the actuator cylinder 104 into the intake side of the pump through the ball valves 200 and into the outer extremities of the complementary receding pump plungers.

The construction of the pump 76 is such as to preclude the necessity of the supercharging by reason of the absence of fluid slippage or leakage within the pump.

The ball valves 200 and 202 materially contribute to the efficient functioning of the pump 76 in circuits of the type shown in Figure 8. I have operated such pumps over an extended period of time and have found that the valve balls stand up under the severest operating conditions and that they are adapted for continuous use over an extended period of time without repair or replacement.

Particular attention is directed to the fact that by using the ball valve arrangement in a circuit of the type disclosed herein, the clashing of the balls as they seat themselves is positively precluded. This will be more readily appreciated by referring again to Figures 6 and 7, wherein I have shown how the balls 212 are seated by the action of the coiled spring 214. Assume that the pump piston 196, which is companion to the ball valve shown in Figures 6 and 7, begins to experience an inward movement. This enables fluid from the annular port or passage 208 connected with the discharge side of the actuator cylinder 104 to be delivered to the ball 212. This will cause the ball to become unseated and permit fluid to enter the companion passage 198 at a speed which is determined by the speed with which the companion plunger 196 moves inwardly. When the plunger reaches the limit of its intake stroke and is about to move in a reverse outward direction, the flow of fluid past the ball 212 ceases and the pressure on the opposite sides of the ball becomes substantially equalized, thereby enabling the ball to gently seat itself at the instant the pump piston 196 begins its compressive stroke. In other words, there is no clashing or violent seating of the ball 212 but, on the contrary, a very gentle seating thereof.

The round seat which corresponds to the spherical surface of the ball also contributes toward the effective functioning of the valve. In this connection I again make reference to the fact that the cross-sectional area of the space 220 indicated in Figure 7, is less than the cross-sectional area of the passageway 210. Thus, a higher speed of fluid flow takes place through the space 220 than through the passageway 210, this higher speed fluid flow aiding in holding the ball 212 perfectly centered during the opening thereof. Therefore, as the ball gradually moves into juxtaposition with its seat 218, the speed of the fluid acting within the space 220 serves to maintain the centered relationship of the ball with respect to its seat, and thereby precludes any engagement or clashing of the ball with the side walls which surround it.

It will also be apparent that by employing the ball valve arrangement just described, fluid pressure acting on the balls cooperates to maintain the balls tightly sealed against their respective seats. This should be clearly distinguished from rotary types of valves and others wherein the pressure of the fluid acting upon the valve does not function to urge the valve against its seat. The importance of the ball valve construction will be more readily apparent when it is understood that in a closed circuit arrangement employed for the purpose of accurately and uniformly propelling a machine tool, the slightest slippage of fluid past a valve in the pump during the compression stroke of the pump plungers will seriously affect the uniformity of fluid flow. Also, such slippage tends to cause a decided increase in fluid temperature. In fact, one of the most serious problems with which hydraulic engineers have heretofore been confronted is that of temperature increase resulting from the slippage or leakage of fluid along the bearing surfaces of rotary valves.

In my above described pumping mechanism, and the valve arrangement provided, the fluid pressure developed during the compressing stroke of the pump plungers will act upon the intake ball valves so as to positively seal the balls against their respective seats. Each outlet valve 202 will not open until the fluid pressure in the passage 198 companion thereto is greater than the pressure in the conduit 224. Therefore, no back flow from the conduit 224 into the passage 198 can ever take place. This is an important advantage which the ball check type of pump presents over pumps in which the control of fluid depends solely upon mechanically actuated valve members. In instances where mechanically actuated valve members are employed, the timed functioning of the valve is controlled mechanically and not in accordance with or in response to predetermined fluid pressure conditions.

From the foregoing it will be apparent that the present invention contemplates a novel and practical valve structure which is particularly designed for pumps adapted for accurate volumetric delivery of fluid at relatively high pressures, and wherein the volumetric delivery may at times be very small. Under such conditions the ball check valves disclosed herein function very efficiently and in fact are superior to conventional rotary valves with which I am familiar.

I prefer to construct the housing material associated with the valve balls of a uniform alloy steel treated so that it will wear in conformity with the surface of the ball, although not as hard as the ball. This enables balls to be used over an extended period of time without requiring replacement. In fact, the longer the ball is used the more perfect becomes the seat in the material associated with the ball. The spherical seat against which the ball engages affords maximum contact area thus precluding excessive surface loading of the metal at any point. It will further be noted that the ball springs hold the balls in proper position throughout the life of the structure, whereby to maintain the same complemental relationship between the engaged surfaces of the balls and their seats. These surfaces may be originally lapped for proper fitting engagement, and the springs hold the balls so that engagement will always be between the complemental lapped surface.

All of the balls are mounted in a unit frame structure or block 205 to facilitate their assembly. It should be understood that care must be exercised in properly freezing or otherwise fitting this core or block member within the pump housing 172. There must be a very tight fit between these parts in order to positively prevent fluid leakage along the peripheral surface of the block 205. The pivoted pump fingers function in cooperation with the ball check valves to increase the efficiency of operation thereof. Not only do these fingers insure symmetry in acceleration and deceleration of the pump plungers, but they also insure the proper dwell or period of inactivity at each end of the plunger stroke and this insures the proper opening and closing of the ball check valves.

The invention is obviously not limited to the specific structural details disclosed herein, but is capable of other modifications and changes without departing from the spirit and scope of the appended claims.

The invention is hereby claimed as follows:

1. A valve assembly comprising a generally cylindrical block member of integral construction, and a housing having a generally cylindrical recess into which the block member is fitted, a first set of fluid actuated shiftable valve members disposed in circumferential relationship within said block, a set of passages formed in and extending along a chord of said cylindrical block member and communicating individually with said valve members on one side thereof, said passages being adapted for connection with individual passages in said housing, a passageway in said block communicating in common with said set of valve members on the other side thereof, a second set of fluid actuated shiftable valve members disposed in circumferential relationship within said block, a set of passageways formed in the block and communicating individually with said second set of valve members on one side thereof, said last named set of passageways being adapted for connection with said individual passages in said housing, and a passageway encircling said block communicating in common with said second set of valve members on the other side thereof.

2. A valve structure comprising a plurality of fluid conducting passages meeting at a juncture point, a valve seat formed at the juncture of said passages, a valve member disposed in one of said passages having a spherical portion arranged for engagement with said seat, said valve member having an annular shoulder formed thereon defining an annular positioning surface and an annular gripping surface relatively angularly disposed to said positioning surface, and a spring for holding and controlling the operation of said valve member, said spring having an annular end convolution determining a plane perpendicular to the axis of said gripping surface, said end convolution engaging said positioning surface and resiliently embracing said gripping surface to hold said valve member and control the cooperation of said valve member spherical portion with said valve seat.

3. A valve structure as defined in claim 2, wherein said valve member is ball shaped.

4. A valve structure as defined in claim 2, wherein said spring is convoluted throughout the major portion of its length, the annular end convolution engaging said positioning surface being of reduced diameter.

5. A valve structure as defined in claim 2, wherein the positioning and gripping surfaces defined by the annular shoulder of the valve member are flat and relatively right angularly disposed.

6. A valve structure as defined in claim 2, wherein the spring is convoluted along its length, there being a plug member threaded into said valve structure having a smooth cylindrical projection resiliently gripped by the convolutions of the spring at the end thereof remote from said valve member.

7. A valve structure as defined in claim 2, wherein said spring is convoluted along its length, said spring annular end convolution lying in a plane transverse to the spring axis.

8. A valve structure comprising a plurality of fluid conducting passages meeting at a juncture point, said passages being axially aligned and of different size, a valve seat formed at the juncture of said passages, a valve member disposed in the larger of said passages having a spherical portion arranged for engagement with said seat, said valve member having an annular shoulder formed thereon defining an annular positioning surface and an annular gripping surface relatively angularly disposed to said positioning surface, and a spring for holding and controlling the operation of said valve member, said spring having an annular end convolution determining a plane perpendicular to the axis of said gripping surface, said end convolution engaging said positioning surface and resiliently embracing said gripping surface to hold said valve member and control the cooperation of said valve member spherical portion with said valve seat, the cross-sectional area of the annular space between the valve member and the side walls of the larger passage within which the valve member is disposed being less than the cross sectional area of the smaller connected passage, whereby as fluid is projected through said passages its flow through said smaller area acts in cooperation with the spring to engage the valve member in proper seating position.

9. A valve structure as defined in claim 8, wherein said spring is convoluted along the major portion of its length, said annular end convolution being smaller than the diameter of the valve member.

10. A valve structure as defined in claim 8, wherein said valve member has its downstream and upstream sections relatively symmetrically disposed.

11. A valve block as defined in claim 1, wherein each of said valve members comprises a ball valve, there being a spring engageable with each ball valve member to control the operation thereof, the springs engageable with said ball valve members in said first set of valve members being of greater strength than the springs engageable with the ball valve members in said second set of valve members.

12. A valve block as defined in claim 1, wherein said cylindrical block member is compressively gripped and thereby fixed into said cylindrical housing recess.

13. A valve structure comprising a block having a machined exterior surface adapted to have a tight fit with a complementary surface in a frame, a first passage extending from a block surface to the interior of said block, a second passage extending from a block surface to the interior of said block and connected to said first passage, one of said passages being of larger cross sectional area than the other, a valve seat formed at the juncture of said passages, and a ball valve member disposed in the larger of said passages and engaging said seat, said ball valve member restricting said larger passage to a useful flow area substantially smaller than that of the smaller of said two passages whereby the velocity of the fluid flow in the passage around the ball valve member is increased.

References Cited in the file of this patent

UNITED STATES PATENTS

| Number | Name | Date |
|---|---|---|
| 152,844 | Johnston | July 7, 1874 |
| 260,030 | Johnson | June 27, 1882 |
| 613,623 | Dolan | Nov. 1, 1898 |
| 716,864 | Casey | Dec. 30, 1902 |
| 1,006,852 | Kelsey | Oct. 24, 1911 |
| 1,055,437 | Aldridge | Mar. 11, 1913 |
| 1,530,287 | Axelson | Mar. 17, 1925 |
| 1,617,603 | Larkin | Feb. 15, 1927 |
| 1,746,335 | Boyce | Feb. 11, 1930 |
| 1,843,068 | Von Wagenheim | Jan. 26, 1932 |
| 1,843,930 | Patterson | Feb. 9, 1932 |
| 1,911,125 | Miller | May 23, 1933 |
| 1,920,123 | Ernst | July 25, 1933 |
| 1,924,423 | Svenson | Aug. 29, 1933 |
| 1,934,486 | Carlson | Nov. 7, 1933 |
| 1,989,117 | Svenson | Jan. 29, 1935 |
| 2,048,524 | Svenson | July 21, 1936 |
| 2,215,257 | Svenson | Sept. 17, 1940 |
| 2,382,452 | Svenson | Aug. 14, 1945 |

FOREIGN PATENTS

| Number | Country | Date |
|---|---|---|
| 19,931 | Great Britain | of 1906 |